(12) United States Patent
Han et al.

(10) Patent No.: US 8,823,223 B2
(45) Date of Patent: Sep. 2, 2014

(54) ELECTRIC VEHICLE USING ELECTRIC MOTOR AND ELECTRIC MOTOR

(75) Inventors: Seungdo Han, Seoul (KR); Jinsoo Park, Seoul (KR); Kwangwook Chun, Seoul (KR); Yunho Kim, Seoul (KR); Jaeho Kim, Seoul (KR); Jiseong Park, Seoul (KR)

(73) Assignee: LG Electronics Inc., Seoul (KR)

( * ) Notice: Subject to any disclaimer, the term of this patent is extended or adjusted under 35 U.S.C. 154(b) by 355 days.

(21) Appl. No.: 13/227,520

(22) Filed: Sep. 8, 2011

(65) Prior Publication Data

US 2012/0133222 A1 May 31, 2012

(30) Foreign Application Priority Data

Nov. 29, 2010 (KR) .................. 10-2010-0120066

(51) Int. Cl.
| | |
|---|---|
| H02K 9/19 | (2006.01) |
| H02K 1/20 | (2006.01) |
| H02K 9/20 | (2006.01) |
| B60L 11/18 | (2006.01) |
| H02K 5/20 | (2006.01) |
| B60L 3/00 | (2006.01) |

(52) U.S. Cl.
CPC ............ *H02K 5/20* (2013.01); *B60L 2270/145* (2013.01); *B60L 2220/14* (2013.01); *B60L 11/1803* (2013.01); *Y02T 10/642* (2013.01); *B60L 2240/425* (2013.01); *H02K 9/19* (2013.01); *Y02T 10/705* (2013.01); *B60L 11/1877* (2013.01); *Y02T 10/641* (2013.01); *Y02T 10/70* (2013.01); *Y02T 10/7005* (2013.01); *B60L 2240/36* (2013.01); *B60L 3/0061* (2013.01)
USPC ............................................. 310/54; 310/64

(58) Field of Classification Search
USPC ....................................................... 310/54, 64
See application file for complete search history.

(56) References Cited

U.S. PATENT DOCUMENTS

| | | | | |
|---|---|---|---|---|
| 3,531,668 | A | * | 9/1970 | Cathey ............................. 310/58 |
| 5,619,956 | A | * | 4/1997 | Koziara et al. ............. 123/41.31 |
| 5,682,074 | A | * | 10/1997 | Di Pietro et al. ............. 310/215 |
| 6,710,479 | B2 | * | 3/2004 | Yoshida et al. .................. 310/52 |
| 7,009,317 | B2 | * | 3/2006 | Cronin et al. .................... 310/54 |
| 7,397,154 | B2 | * | 7/2008 | Tilton et al. ...................... 310/54 |
| 8,446,056 | B2 | * | 5/2013 | Bradfield ......................... 310/58 |
| 8,456,045 | B2 | * | 6/2013 | Hayashi et al. ................. 310/57 |
| 2007/0013241 | A1 | * | 1/2007 | Schiferl et al. .................. 310/54 |
| 2009/0261668 | A1 | * | 10/2009 | Mantere .......................... 310/54 |
| 2010/0231066 | A1 | * | 9/2010 | Korner ............................. 310/61 |
| 2012/0091835 | A1 | * | 4/2012 | Kim et al. ........................ 310/54 |

FOREIGN PATENT DOCUMENTS

| | | |
|---|---|---|
| JP | 9154257 | 6/1997 |
| JP | 2003-324901 | 11/2003 |
| JP | 2007-116807 | 5/2007 |

* cited by examiner

*Primary Examiner* — Burton Mullins
(74) *Attorney, Agent, or Firm* — McKenna Long & Aldridge LLP (57) ABSTRACT

An electric motor includes a frame, a stator disposed in the frame, a rotor disposed in the frame, and a cooling unit configured to perform a cooling operation by supplying a cooling fluid into the frame. Under this configuration, a cooling function may be enhanced, and a high output density and high efficiency may be implemented.

20 Claims, 12 Drawing Sheets

ELECTRIC VEHICLE USING ELECTRIC MOTOR AND ELECTRIC MOTOR

CROSS-REFERENCE TO A RELATED APPLICATION

The present disclosure relates to subject matter contained in priority Korean Application No. 10-2010-0120066, filed on Nov. 29, 2010, which is herein expressly incorporated by reference in its entirety.

BACKGROUND OF THE INVENTION

1. Field of the Invention

The present invention relates to an electric vehicle using an electric motor and an electric motor, and particularly, to an electric vehicle using an electric motor and an electric motor capable of having a compact configuration and capable of enhancing a cooling function, an output density and efficiency.

2. Background of the Invention

An electric motor is an apparatus for converting electric energy into mechanical energy.

This electric motor may be classified in to a direct current (DC) electric motor and an alternating current (AC) electric motor according to a used power.

The AC electric motor may be divided into a three-phase AC electric motor and a single phase AC electric motor, and each of the three-phase AC electric motor and the single phase AC electric motor includes an inductive electric motor and a synchronous motor.

The inductive electric motor is being widely used owing to its advantages such as direct connection to power, a simple and firm structure, low costs and easy manipulation.

Recently, the electric motor is utilized as a driving source of a vehicle so as to prevent environmental pollution due to harmful gases generated from vehicles at the time of fuel combustion.

The electric motor used as a driving source of a vehicle, i.e., an electric motor for an electric vehicle may be provided with an additional cooling means since it generates heat.

The cooling means of the electric motor for an electric vehicle may include an air cooling type for cooling an electric motor by forcibly blowing air, and a water cooling type for cooling an electric motor by supplying water.

However, the conventional electric motor for an electric vehicle may have the following problems.

Firstly, when an air cooling type cooling means is used, a fan, a duct, etc. are provided to increase the entire size of the electric motor.

Secondly, since a cooling function is inferior to heat generation of the electric motor, an output of the electric motor may not be enhanced.

Thirdly, when an water cooling type cooling means is used, the electric motor may have a complicated configuration and water leakage may occur due to cracks. When water leakage occurs, the electric motor may be damaged.

SUMMARY OF THE INVENTION

Therefore, an object of the present invention is to provide an electric motor capable of enhancing a cooling function.

Another object of the present invention is to provide an electric vehicle using an electric motor and an electric motor capable of preventing components from having partial temperature increment.

Still another object of the present invention is to provide an electric vehicle using an electric motor and an electric motor capable of having a compact configuration, and capable of implementing a high output and high efficiency.

To achieve these and other advantages and in accordance with the purpose of the present invention, as embodied and broadly described herein, there is provided an electric motor, including a frame, a stator disposed in the frame, a rotor disposed in the frame so as to be rotatable with respect to the stator, a cooling fluid passage portion to introduce cooling fluid between the frame and the stator, and a cooling unit to form a cooling fluid circulation circuit with the cooling fluid passage portion.

The cooling fluid passage portion may be a cooling pipe disposed between the frame and the stator, and the pipe may have one or more openings to introduce the cooling fluid between the frame and the stator.

One or more grooves may be formed at the frame to flow therethrough the cooling fluid introduced by the cooling pipe in order to cool the frame.

One or more openings of the cooling pipe may be inclined toward an end portion of the stator in order to introduce cooling fluid to the end portion of the stator.

The cooling fluid passage portion may be arranged at the frame in order to allow cooling fluid to flow therethrough and the cooling fluid passage portion may include one or more openings to introduce cooling fluid towards the stator.

One or more grooves may be formed at the stator to flow therethrough the cooling fluid introduced by the cooling fluid passage portion in order to cool the stator.

The cooling fluid passage portion may include one or more openings arranged to introduce cooling fluid above a coil end portion of the stator.

The cooling fluid passage portion may include an extension portion, and the extension portion may include one or more openings arranged to introduce cooling fluid towards a coil end portion of the stator and one or more openings arranged to introduce cooling fluid towards an end portion of the rotor.

According to another aspect of the present invention, there is provided an electric motor for an electric vehicle, including a frame, a stator disposed in the frame, a rotor disposed in the frame so as to be rotatable with respect to the stator, and a cooling fluid passage portion to introduce cooling fluid between the frame and the stator.

The cooling fluid passage portion may be a cooling pipe disposed between the frame and the stator, and the pipe may have one or more openings to introduce the cooling fluid between the frame and the stator.

An accommodation portion may be formed at the frame and another accommodation portion may be formed at the stator to accommodate the cooling pipe between the frame and the stator.

One or more grooves may be formed at the frame to flow therethrough the cooling fluid introduced by the cooling pipe in order to cool the frame.

One or more grooves may be formed at the stator to flow therethrough the cooling fluid introduced by the cooling pipe in order to cool the stator.

One or more openings of the cooling pipe may be inclined toward an end portion of the stator in order to introduce cooling fluid to the end portion of the stator.

The cooling fluid passage portion may be arranged at the frame in order to allow cooling fluid to flow therethrough.

The cooling fluid passage portion may include one or more openings to introduce cooling fluid towards the stator.

One or more grooves may be formed at the stator to flow therethrough the cooling fluid introduced by the cooling fluid passage portion in order to cool the stator.

The cooling fluid passage portion may include one or more openings arranged to introduce cooling fluid above a coil end portion of the stator.

The cooling fluid passage portion may include an extension portion, and the extension portion may include one or more openings arranged to introduce cooling fluid towards a coil end portion of the stator.

The cooling fluid passage may include an extension portion, and the extension portion may include one or more openings arranged to introduce cooling fluid towards an end portion of the rotor.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

For the sake of brief description with reference to the drawings, the same or equivalent components will be provided with the same reference numbers, and description thereof will not be repeated.

Hereinafter, an electric motor according to the present invention will be explained in more detail with reference to the attached drawings.

Figure 1:
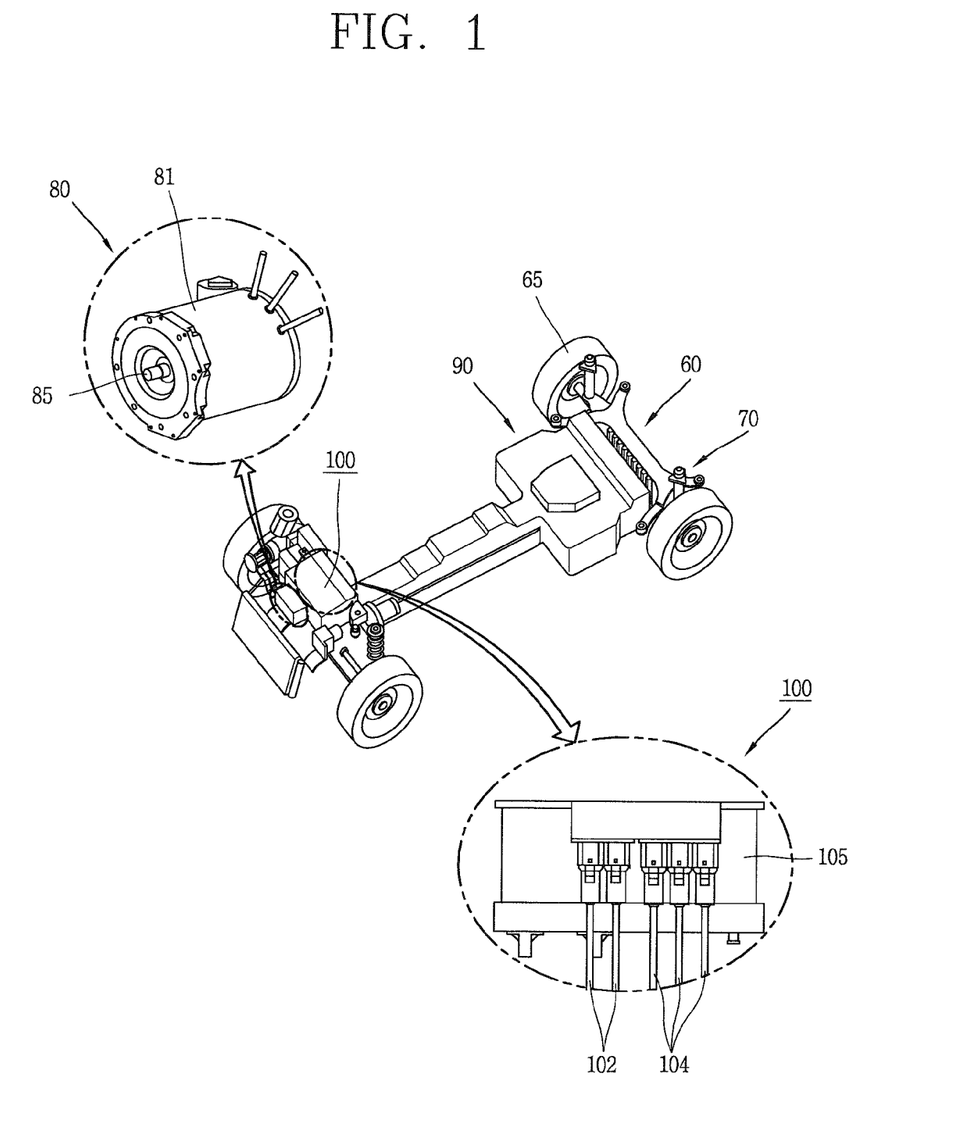
FIG. 1 is a schematic configuration diagram illustrating an electric vehicle having an inverter apparatus according to an embodiment of the present invention.

As illustrated in FIG. 1, an electric vehicle according to an embodiment of the present disclosure may include a body or car body 60, a wheel 65 provided in the car body 60, an electric motor 80 configured to drive the wheel 65, a battery 90 provided in the car body 60, and an inverter apparatus 100 connected to the battery 90 and electric motor 80, respectively, to supply drive power to the electric motor 80.

A passenger space for allowing a driver and/or a passenger to get on, though not shown in the drawing, may be provided at an upper region of the car body 60.

A plurality of wheels 65 for driving a vehicle may be provided in the car body 60.

The plurality of wheels 65 may be provided at both front and rear sides of the car body 60.

A suspension device 70 may be provided between the car body 60 and the wheel 65 to absorb vibration and/or shock generated while driving a road.

A battery 90 for supplying direct-current power may be provided in the car body 60.

The battery 90 may be configured with a secondary battery capable of charging and discharging.

An electric motor 80 may be provided at a side of the wheel 65 to provide a driving force to the wheel 65. The electric motor 80 may be configured with a three phase alternate-current electromotor being operated with three phase alternate-current power.

The electric motor 80 may include a frame 81 provided with an accommodation space therein, a stator (not shown) disposed within the frame 81, a rotor (not shown) rotatably disposed around a rotation shaft 85 with respect to the stator.

A gearbox (not shown) for transmitting a rotational force to the wheel 65 with a predetermined gear ratio may be provided at an output end portion of the rotation shaft of the electric motor 80.

An inverter apparatus 100 for converting the direct-current power of the battery 90 into alternate-current power to output the alternate-current power may be provided between the electric motor 80 and the battery 90.

A plurality of input cables 102 for receiving direct-current power and a plurality of output cables 104 for outputting drive power (alternate-current power) may be provided at a side of the inverter apparatus 100.

Figure 2:
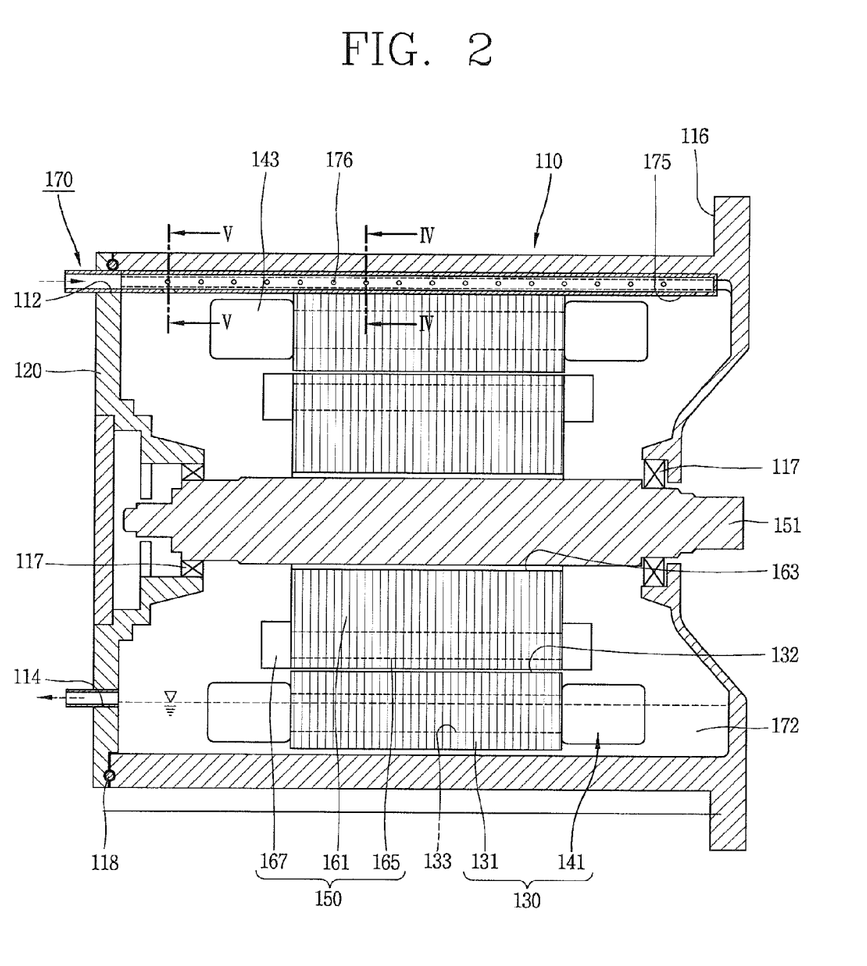
FIG. 2 is a sectional view of an electric motor of FIG. 1.

As shown in FIG. 2, The electric motor 80 may comprise a frame 110, a stator 130 disposed in the frame 110, a rotor 150 disposed in the frame 110 so as to be rotatable with respect to the stator 130, and a cooling unit 170 configured to perform a cooling operation by supplying a cooling fluid 172 into the frame 110.

The frame 110 may be provided with an accommodation space therein, and may be formed to have a circular sectional surface.

The frame 110 may be formed in a cylindrical shape having one or more open sides. A cover 120 may be provided at the end of the open side of the frame 110. A sealing member 118 configured to hermetically seal the inside of the frame 110 from the outside may be provided at a contact part between the end of the frame 110 and the cover 120. This may allow the cooling fluid 172 inside the frame 110 not to be leaked to the outside.

A flange portion 116 extended in a radius direction of the rotor 150 may be provided at one side of the frame 110. Accordingly, a contact area of the frame 110 may be increased to allow the frame 110 to be easily fixed to an object.

The stator 130 may be provided in the frame 110. The stator 130 may include a stator core 131 having a plurality of slots 133 and teeth (not shown), and a stator coil 141 disposed at the slots 133 of the stator core 131.

The stator core 131 may be formed by laminating a plurality of electric steel plates with an insulated state. A rotor accommodation hole 132 for rotatably accommodating the rotor 150 with a predetermined air gap may be penetratingly formed at a central region of the stator core 131. The slots 133 and the teeth may be formed along a circumferential direction of the rotor accommodation hole 132. The stator coil 141 may be arranged at the slots 133. Here, the stator coil 141 may be configured to utilize a three-phase AC power as an input power. Coil ends 143 of the stator coil 141 may be outwardly protruding from two ends of the stator core 131.

The rotor 150 may be rotatably arranged at a central region of the stator core 131. The rotor 150 may be implemented as an induction rotor including a rotor core 161, and conductor bars 165 provided at the rotor core 161. The first embodiment discloses a three-phase induction electric motor having a simplified and firm structure and low costs. End rings 167 configured to form a closed circuit by being connected to the respective conductor bars 165 may be arranged at two ends of the rotor core 161.

A rotation shaft 151 may be coupled to a central region of the rotor core 161. A shaft hole 163 for inserting the rotation shaft 151 may be penetratingly formed at a central region of the rotor core 161. The rotation shaft 151 may be extending to both sides of the rotor core 161. The rotation shaft 151 may be rotatably supported at both sides by the frame 110 and the cover 120. A bearing 117 for rotation-supporting the rotation shaft 151 may be provided at the frame 110 and the cover 120, respectively.

A cooling unit 170 may be provided in the frame 110 so as to cool inside of the frame 110 by supplying the cooling fluid 172. Here, the cooling fluid 172 may be implemented as oil. The oil may be oil having a proper viscosity and having high resistances against heat and oxidation (e.g., oil for a transmission of an automobile). The cooling fluid 172 may be a refrigerant applied to a vapor compression type refrigerating cycle. Hereinafter, it is assumed that the cooling fluid 172 is implemented as oil.

The frame 110 may be installed such that the rotation shaft 151 of the rotor 150 is parallel to the ground.

The cooling unit 170 may include a cooling fluid injection portion 171 configured to inject the cooling fluid 172 between the frame 110 and the stator 130.

The cooling fluid injection portion 171 may be arranged at an inner upper region of the frame 110.

The cooling fluid injection portion 171 may be provided with an injection pipe 175 disposed between the frame 110 and the stator 130.

Injection pipe partial accommodation portions 118a and 118b configured to accommodate parts of the injection pipe 175 may be concavely formed at the frame 110 and the stator 130, respectively.

The injection pipe partial accommodation portions 118a and 118b may be configured to accommodate the injection pipe 175 therein in a cooperative manner. More concretely, a injection pipe partial accommodation portion 118a may be formed at the frame 110 in an upwardly concaved manner, and a injection pipe partial accommodation portion 118b may be formed on an outer circumferential surface of the stator core 131 of the stator 130 in a downwardly concaved manner.

The cooling fluid injection portion 171 may include a frame groove 185 concavely formed on an inner surface of the frame 110 with a predetermined depth such that the cooling fluid 172 injected from the injection pipe 175 flows. Under this configuration, the cooling fluid 172 injected from the injection pipe 175 may smoothly flow, and the frame 110 may be rapidly cooled.

Figure 3:
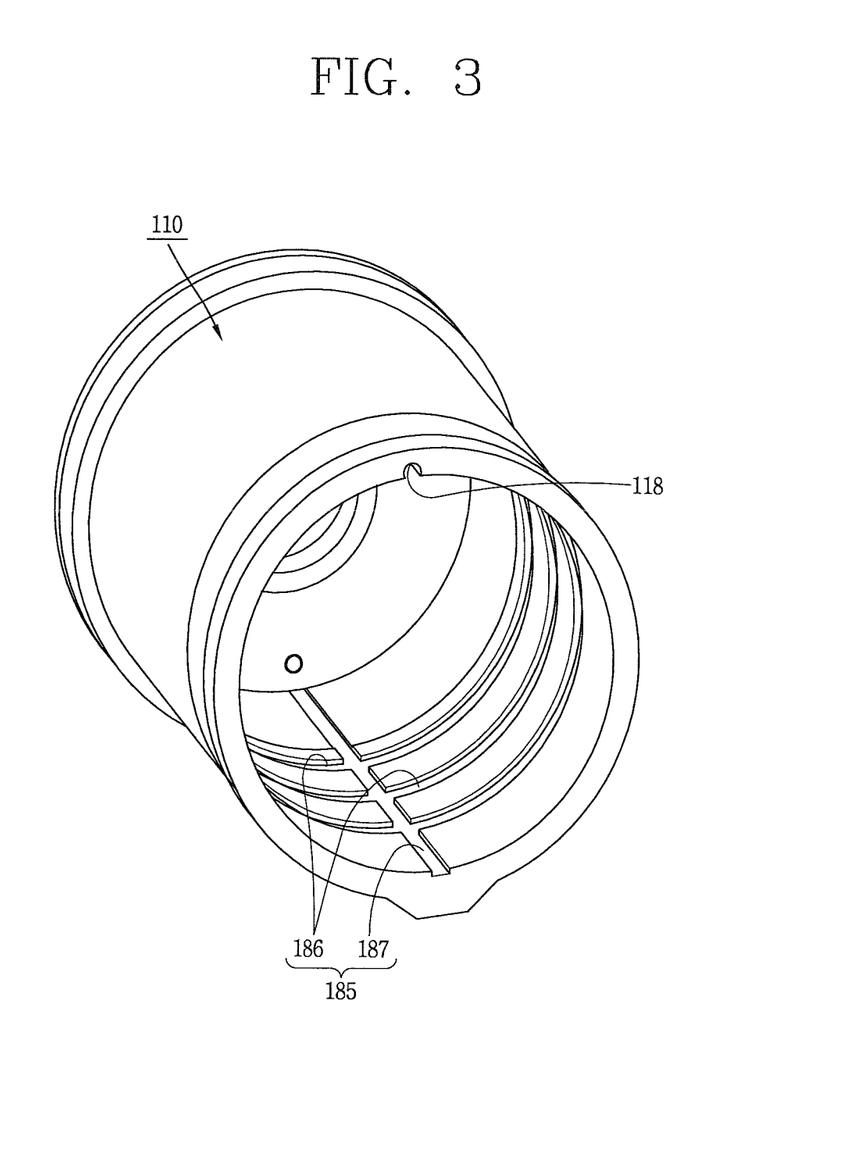
FIG. 3 is a perspective view of a frame of FIG. 2.

As shown in FIG. 3, the frame groove 185 may include a plurality of first grooves 186 formed in a curved line so as to be extending in a circumferential direction of the frame 110, and a second groove 187 formed in a straight line so as to have a long length on an inner surface of the frame 110 in an axial line direction. The frame groove 185 may be formed at both sides of the injection pipe partial accommodation portions 118a and 118b.

The first grooves 186 may be downwardly extending from an inner upper portion of the frame 110 so as to form a circular arc. The second groove 187 may be formed on an inner bottom surface of the frame 110. Some parts (upper region) of the first grooves 186 may be formed on an inner surface of the frame 110, and other parts (lower region) of the first grooves 186 may be formed on an outer surface of the stator 130. Accordingly, when the frame 110 and the stator 130 are coupled to each other, the upper region and the lower region may form a channel of the cooling fluid 172 in a cooperative manner.

An inlet 112 and an outlet 114 through which the cooling fluid 172 is introduced and discharged may be formed at the frame 110. More concretely, the inlet 112 and the outlet 114 may be penetratingly formed at the cover 120. Here, the outlet 114 may be formed at a height corresponding to the bottom surface of the frame 110 such that the cooling fluid on the bottom surface of the frame 110 is directly leaked to the outside. Alternatively, the outlet 114 may be formed at a predetermined height from the bottom surface of the frame 110 such that the cooling fluid 172 is stored in the frame 110 by a predetermined amount. Under this configuration, partial regions of the stator 130 and the frame 110 always come in contact with the cooling fluid 172. This may enhance a cooling effect.

The cooling fluid injection portion 171, more concretely, the injection pipe 175 may be provided with a plurality of injection openings (nozzle openings) 176 through which the cooling fluid 172 is injected.

The injection openings 176 may be formed such that the cooling fluid 172 is injected to the frame groove 185. The injection openings 176 and the frame grooves 185 may be spacing from each other with the same interval. Alternatively, the plurality of injection openings 176 may be formed at one frame groove 185.

Figure 4:
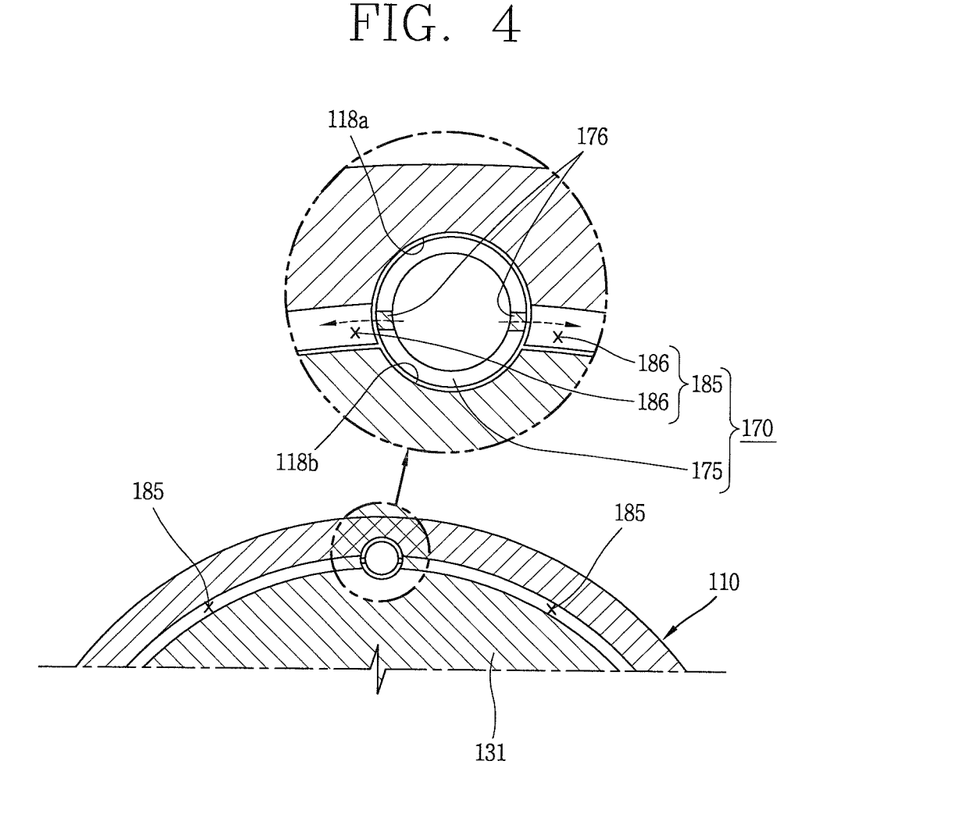
FIG. 4 is a sectional view taken along line 'IV-IV' in FIG. 2.
Figure 5:
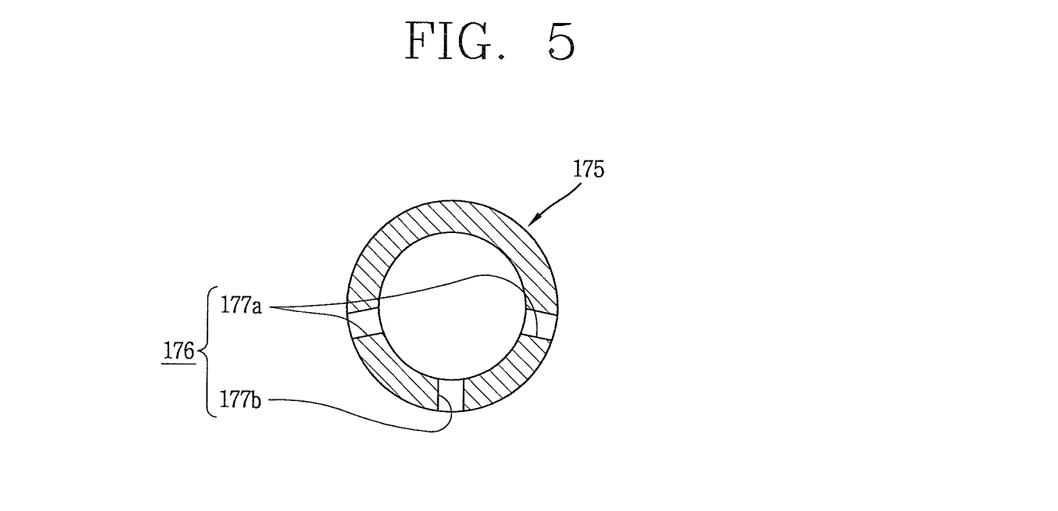
FIG. 5 is a sectional view taken along line 'V-V' in FIG. 2.

As shown in FIG. 4, a pair of injection openings 176 may be formed at both sides of the injection pipe 175 such that the cooling fluid 172 is injected to both sides. Injection openings 176 configured to inject the cooling fluid 172 toward the end of the stator 130 may be further provided at the injection pipe 175. As shown in FIG. 5, the injection openings 176 may be formed at lower parts of the injection pipe 175. More concretely, the injection openings 176 may be formed at two ends of the injection pipe 175 in a lengthwise direction of the injection pipe 175. Accordingly, the injection openings 176 may be configured to directly inject the cooling fluid 172 toward two ends of the stator 130, i.e., the coil ends 143 of the stator coil 141.

As shown in FIG. 5, the injection openings 176 may include a plurality of first injection openings 177a formed at both sides of the injection pipe 175 so as to inject the cooling fluid 172 toward the frame groove 185 (first grooves 186), and a plurality of second injection openings 177b formed at lower parts of the injection pipe 175 so as to inject the cooling fluid 172 toward the end of the stator coil 141.

Figure 6:
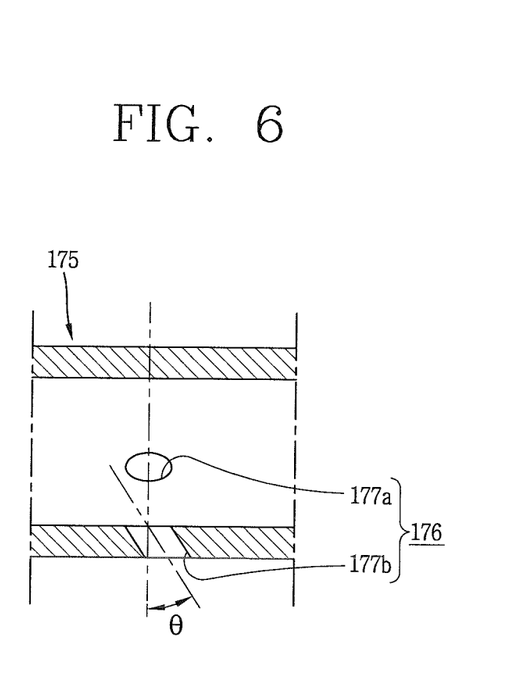
FIG. 6 is an enlargement view of a main part of FIG. 2.

As shown in FIG. 6, some parts of the second injection openings 177b may be formed to have a predetermined inclination angle ($\theta$) with respect to a vertical line such that the cooling fluid 172 is injected to an upper region of the coil ends 143 of the stator coil 141.

Other parts of the second injection openings 177b may be positioned above the respective coil ends 143 such that the cooling fluid 172 is injected to an upper surface of each coil end 143.

The plurality of second injection openings 177b may be positioned above the respective coil ends 143 such that the cooling fluid 172 is injected to an upper side of each coil end 143.

Once power is supplied to the stator coil 141 to generate a magnetic field (rotation magnetic field), the rotor 150 rotates centering around the rotation shaft 151 by an electromagnetic induction. A rotation force of the rotor 150 may be output to the outside through the rotation shaft 151. When power is supplied to the stator coil 141, an inner temperature of the frame 110 is increased due to a mechanical loss such as a copper loss, a core loss and component frictions.

Once the rotor 150 starts to rotate, the cooling fluid 172 may be injected to the inside of the frame 110 through the cooling fluid injection portion 171. Here, the cooling unit 170 may be configured to inject the cooling fluid 172 when the inner temperature of the frame 110 reaches a predetermined temperature.

The cooling fluid 172 introduced into the injection pipe 175 is injected through the injection openings 176. Here, the cooling fluid 172 injected through the first injection openings 177a of the injection openings 176 flows along the frame groove 185, thereby cooling the frame 110 and the stator 130.

Some parts of the cooling fluid 172 are injected to the respective coil ends 143 of the stator coil 141 through the second injection openings 177b, thereby preventing partial temperature increment of the coil ends 143 of the stator coil 141. As the cooling fluid 172 is directly applied to the frame 110 and the stator 130, the frame 110 and the stator 130 are rapidly cooled. This may enhance an output density and efficiency of the electric motor.

The cooling fluid 172 downwardly flowing along the frame groove 185 may be leaked to the outside of the frame 110 through the outlet 114. In a case that the outlet 114 is formed to have a predetermined height from the bottom surface of the frame 110, a predetermined amount of the cooling fluid 172 may be temporarily stored in the frame 110. This may allow some parts of the frame 110 and the stator 130 to be soaked in the temporarily-stored cooling fluid 172. Accordingly, a contact time of the frame 110 and the stator 130 with the cooling fluid 172 may be prolonged, and a cooling effect of the frame 110 and the stator 130 may be enhanced.

Hereinafter, an electric motor according to a second embodiment of the present invention will be explained with reference to FIGS. 7 to 9.

The same components as the aforementioned components will be provided with the same reference numerals, and detailed explanations thereof will be omitted.

An electric motor according to a second embodiment of the present invention comprises a frame 110, a stator 130 disposed in the frame 110, a rotor 150 disposed in the frame 110 so as to be rotatable with respect to the stator 130, and a cooling unit 190 configured to perform a cooling operation by supplying a cooling fluid 172 into the frame 110.

The cooling unit 190 may include a cooling fluid injection channel 191 formed at the frame 110.

Figure 7:
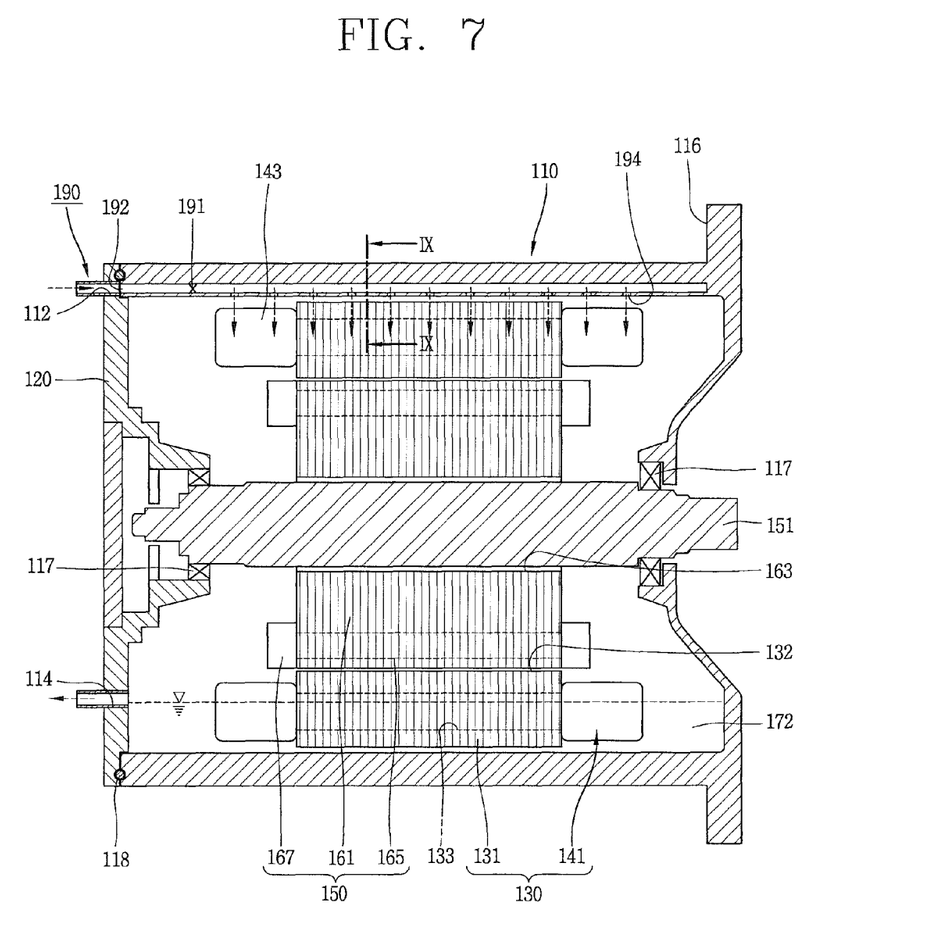
FIG. 7 is a sectional view of an electric motor according to a second embodiment of the present invention.
Figure 9:
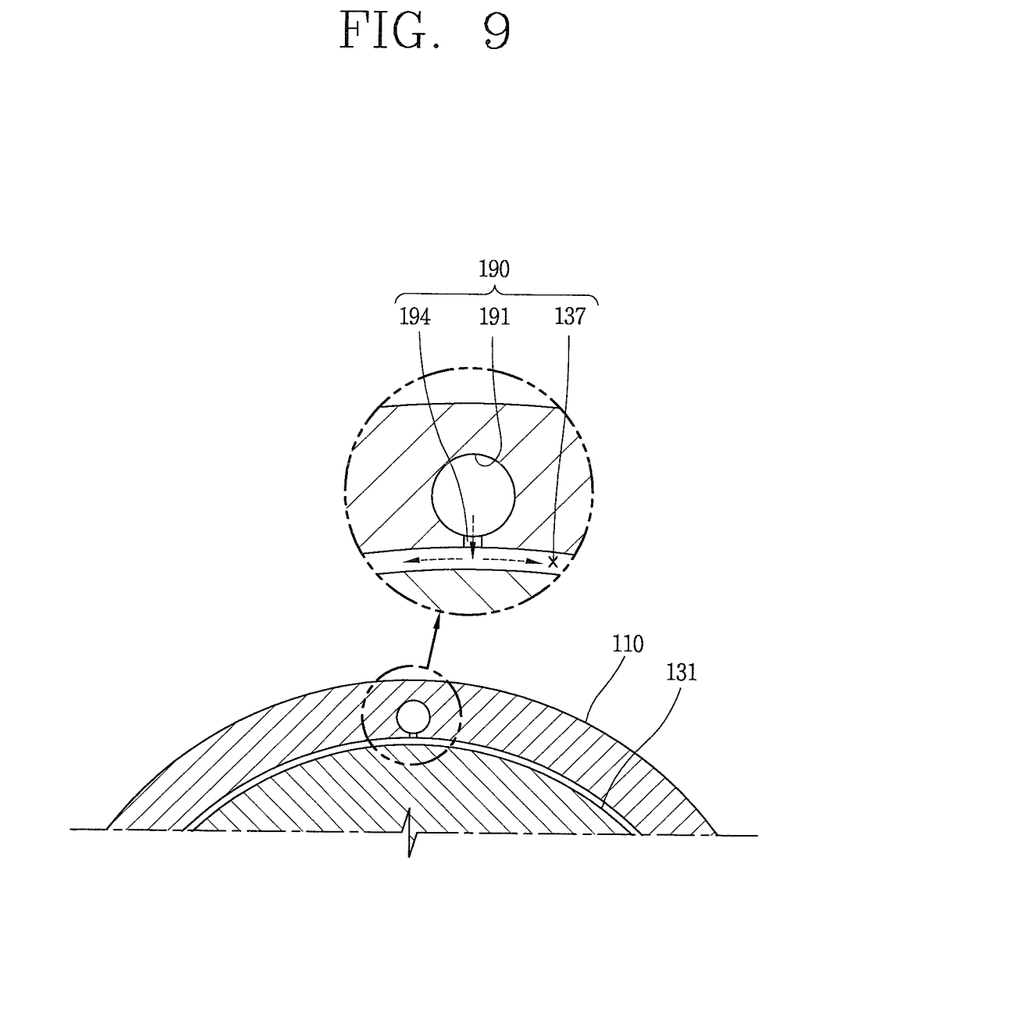
FIG. 9 is a sectional view taken along line 'IX-IX' in FIG. 7.

More concretely, as shown in FIGS. 7 and 9, the cooling fluid injection channel 191 may be concavely formed at the frame 110 so as to have a long length in an axial line direction such that the cooling fluid 172 is introduced into the frame 110. The cooling fluid injection channel 191 may be formed at an upper intermediate part of the frame 110.

The cooling fluid injection channel 191 may be formed at the end of the cover 120 such that the cooling fluid 172 is introduced therein to.

The cooling fluid injection channel 191 may be provided with a plurality of outlets 194 such that the cooling fluid 172 is injected toward the stator 130 disposed therein. The outlets 194 may be formed below the cooling fluid injection channel 191. The outlet 194 may be formed in plurality in number, and the plurality of outlets 194 may be spacing from each other in a longitudinal direction. Here, the outlets 194 may be spacing from each other with a predetermined interval. The outlets 194 may be configured in the form of a circle, or a slit having a length greater than a width.

The cooling unit 190 may be further provided with stator grooves 137 concavely formed at the stator 130. Accordingly, the cooling fluid 172 injected from the cooling fluid injection channel 191 may downwardly flow along an outer surface of the stator core 131. As the cooling fluid 172 is directly applied to the surface of the stator core 131, the stator 130 may be cooled more rapidly.

Figure 8:
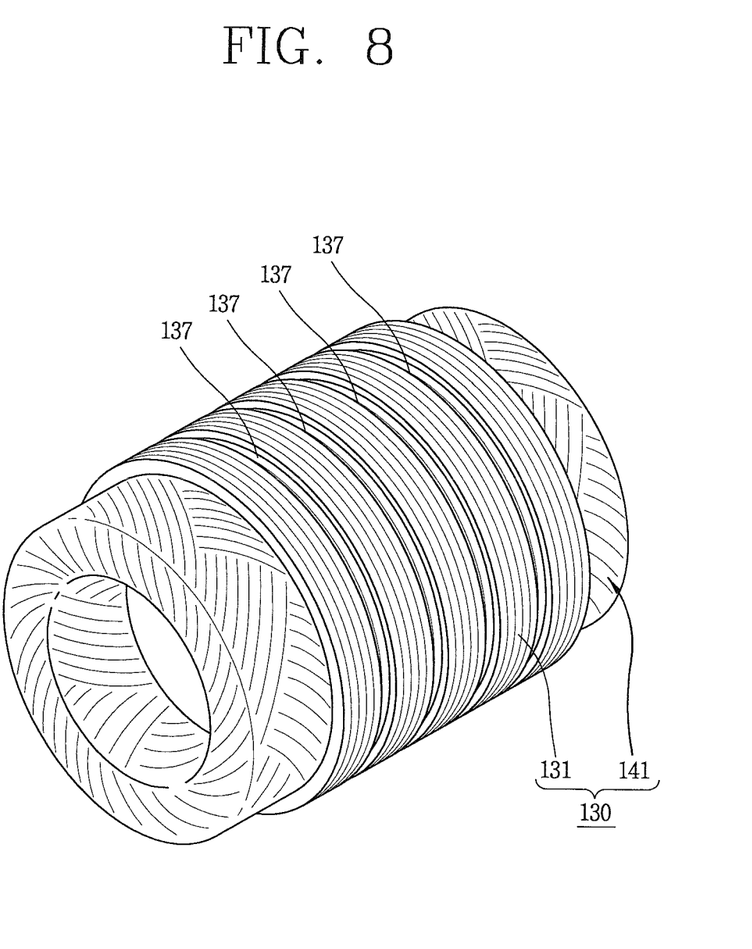
FIG. 8 is a perspective view of a stator groove of the electric motor of FIG. 7.

As shown in FIG. 8, the stator grooves 137 may be concaved from an outer surface of the stator core 131 by a predetermined depth, and may be extending along a circumferential direction.

The stator grooves 137 may be formed with an interval corresponding to the interval of the outlets 194 of the cooling fluid injection channel 191. Here, at least one pair of outlets 194 may be formed at one stator groove 137 of the cooling fluid injection channel 191 such that the cooling fluid is injected to both sides of the stator groove 137.

Some of the outlets 194 of the cooling fluid injection channel 191 may be formed such that the cooling fluid 172 is injected to the coil ends 143 of the stator coil 141. That is, some of the outlets 194 may be disposed above the coil ends 143 of the stator coil 141, and may downwardly inject the cooling fluid 172 toward the coil ends 143.

Under this configuration, once power is applied to the stator coil 141 to generate a magnetic field (rotation magnetic field), the rotor 150 rotates centering around the rotation shaft 151 by an electromagnetic induction.

Once the rotor 150 starts to rotate, the cooling fluid 172 may be injected to the inside of the frame 110 through the cooling fluid injection channel 191.

The cooling fluid 172 may be introduced through an inlet 192 of the cooling fluid injection channel 191, and the introduced cooling fluid 172 may be injected through the respective outlets 194. The injected cooling fluid 172 cools the stator 130 while flowing along the stator grooves 137.

Some of the cooling fluid 172 may be injected to the respective coil ends 143 of the stator coil 141, thereby rapidly cooling the coil ends 143 of the stator coil 141. This may prevent partial temperature increment of the coil ends 143.

The cooling fluid 172 downwardly flowing along the stator grooves 137 is leaked to outside of the frame 110 through the outlet 114, and is introduced into the frame 110 through the inlet 112. As these processes are repeated, a cooling operation is performed.

Hereinafter, an electric motor according to a third embodiment of the present invention will be explained with reference to FIGS. 10 and 11.

Figure 10:
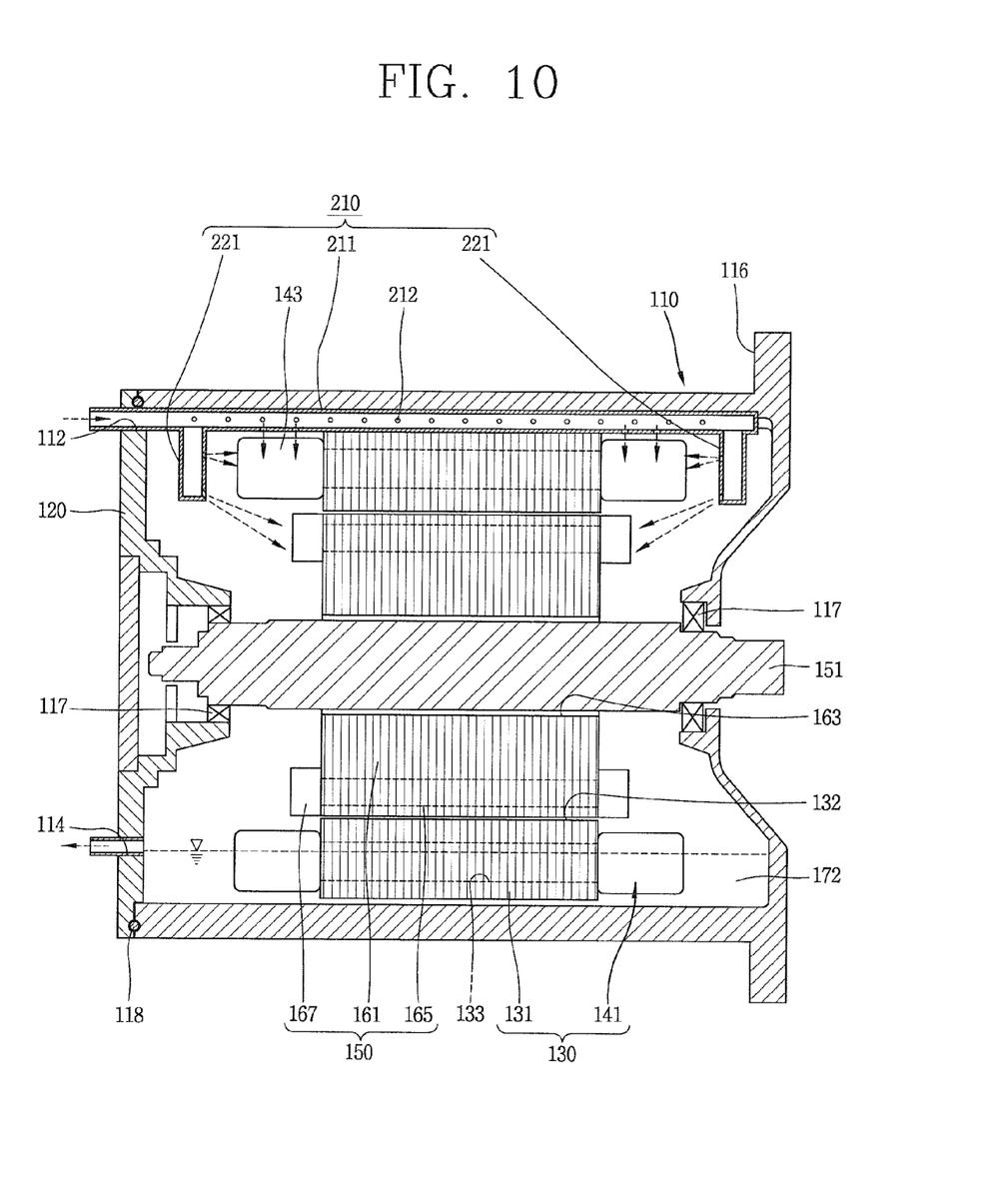
FIG. 10 is a sectional view of an electric motor according to a third embodiment of the present invention.

As shown in FIG. 10, the electric motor according to a third embodiment of the present invention comprises a frame 110, a stator 130 disposed in the frame 110, a rotor 150 disposed in the frame 110 so as to be rotatable with respect to the stator 130, and a cooling unit 210 configured to perform a cooling operation by supplying a cooling fluid 172 into the frame 110.

The cooling unit 210 may include a first injection portion 211 configured to inject the cooling fluid 172 between the frame 110 and the stator 130, and a second injection portion 221 configured to inject the cooling fluid 172 toward the end of the stator 130. As the cooling fluid 172 is simultaneously injected to a relatively wider region of the frame 110, the inside of the frame 110 may be cooled more rapidly.

Figure 11:
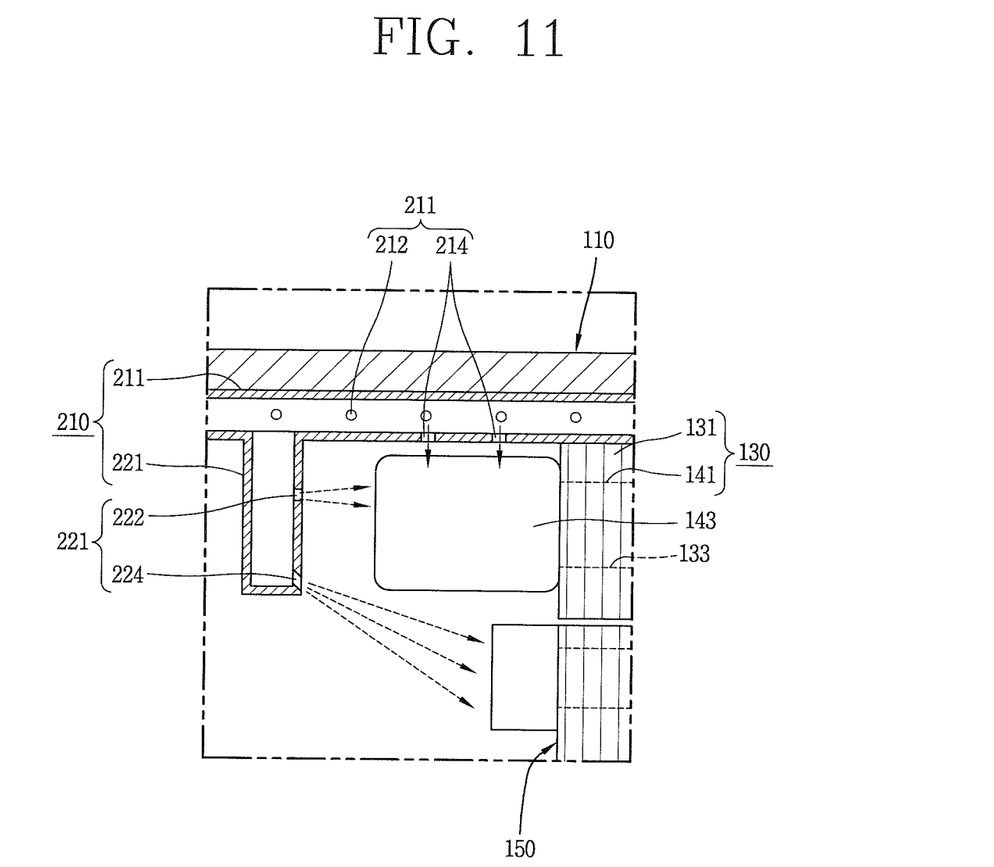
FIG. 11 is an enlargement view of a main part of FIG. 10.

As shown in FIG. 11, the first injection portion 211 may include a plurality of injection openings 212 configured to inject the cooling fluid 172 to a space between the frame 110 and the stator 130, and lower injection openings 214 configured to inject the cooling fluid 172 to upper surfaces of the corresponding coil ends 143. The lower injection opening 214 may be formed in plurality in number. More concretely, a plurality of lower injection openings 214 may be arranged above one coil end 143.

The second injection portion 221 may be configured to inject the cooling fluid 172 toward the coil ends 143 of the stator coil 141. Under this configuration, partial temperature increment of the coil ends 143 of the stator coil 141 may be prevented. More concretely, the second injection portion 221 may be configured to inject the cooling fluid 172 toward the end of each coil end 143.

The second injection portion 221 may be configured to inject the cooling fluid 172 toward the end of the rotor 150. Under this configuration, the cooling fluid 172 is directly supplied to the rotor 150. Accordingly, the rotor 150 spacing from the stator 130 and having a difficulty in being cooled since an air layer is formed on a circumferential surface thereof may be rapidly cooled.

The second injection portion 221 may be configured to inject the cooling fluid 172 toward the ends of the coil ends 143 of the stator coil 141 and the end of the rotor 150. Under this configuration, partial temperature increment of the coil ends 143 of the stator coil 141 may be prevented. Since the cooling fluid 172 is directly applied to the rotor 150, the rotor 150 may be cooled more rapidly.

The first injection portion 211 may be arranged along an axial line direction of the rotor 150. The first injection portion 211 may be configured in the form of a pipe. The first injection portion 211 may be arranged at an inner upper region of the frame 110.

As shown in FIG. 10, a plurality of injection openings 212 may be formed at both sides of the first injection portion 211 such that the cooling fluid 172 is injected to two sides. At least one of the frame grooves 185 and/or the stator grooves 137 may be formed at the frame 110 and/or the stator 130 such that the cooling fluid 172 flows.

The injection openings 212 may be formed to be spacing from each other in an axial line direction. The frame grooves 185 and/or the stator grooves 137 may be spacing from each other with the same interval as the interval between the injection openings 212.

The second injection portion 221 may be diverged from the first injection portion 211. For instance, the second injection portion 221 may be arranged so as to be perpendicular to the first injection portion 211 by being diverged from the first injection portion 211. Since the first injection portion 211 is arranged in an axial line direction of the rotor 150, the second injection portion 221 may be arranged in a radial direction of the rotor 150.

The second injection portion 221 may be arranged at both sides of the stator 130, respectively. Accordingly, the cooling fluid 172 may be injected to two end regions of the stator 130 more effectively.

The second injection portion 221 may be arranged at both sides of the stator 130, and may be configured to inject the cooling fluid 172 toward two ends of the rotor 150.

The second injection portion 221 may include upper injection openings 222 configured to inject the cooling fluid 172 toward the coil ends 143 of the stator coil 141, and lower injection openings 224 configured to inject the cooling fluid 172 toward the end of the rotor 150. Each of the upper injection openings 222 may be configured to inject the cooling fluid 172 toward the end of the corresponding coil end 143. The lower injection openings 224 may be formed to be inclined such that the cooling fluid 172 is injected toward the end of the rotor 150.

Under this configuration, some parts of the cooling fluid 172 introduced into the frame 110 through the inlet 112 is injected to a space between the frame 110 and the stator 130 through the first injection portion 211. Other parts of the cooling fluid 172 may be injected to the end of the stator 130 through the second injection portion 221. As the cooling fluid 172 is injected to a relatively wider region of the frame 110, the inside of the frame 110 may be cooled more rapidly. Furthermore, the coil ends 143 of the stator coil 141 and the rotor 150 may be rapidly cooled.

Hereinafter, an electric motor according to a fourth embodiment of the present invention will be explained with reference to FIG. 12.

Figure 12:
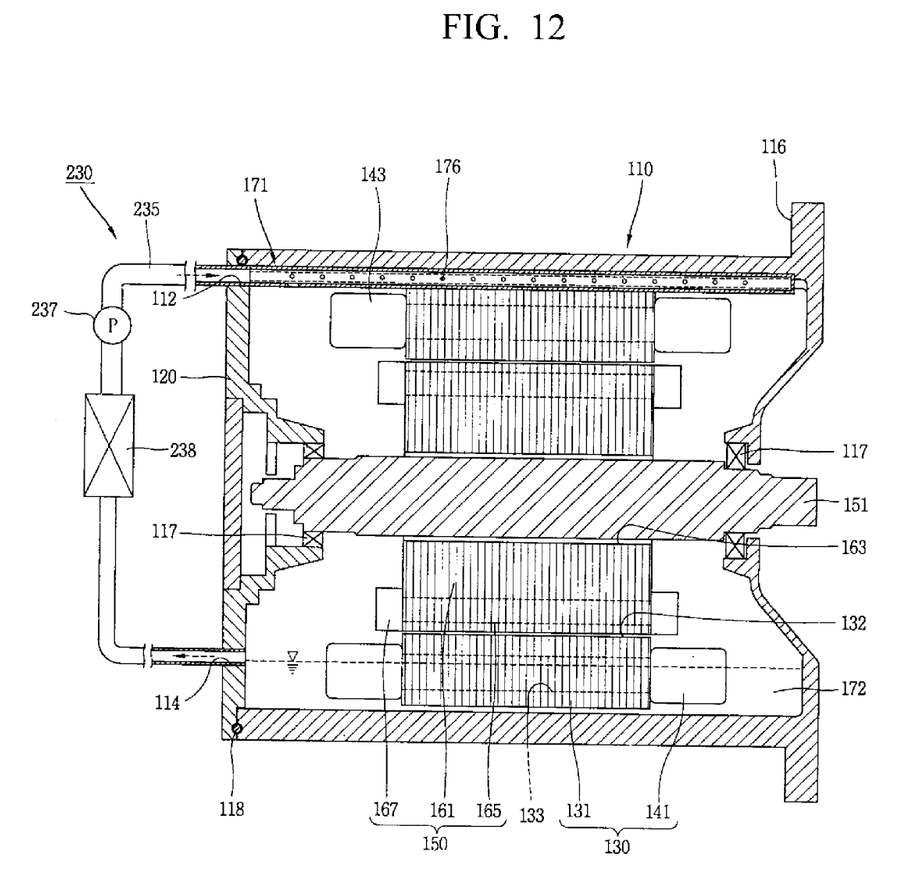
FIG. 12 is a sectional view of an electric motor according to a fourth embodiment of the present invention.

As shown in FIG. 12, an electric motor according to a fourth embodiment of the present invention comprises a frame 110, a stator 130 disposed in the frame 110, a rotor 150 disposed in the frame 110 so as to be rotatable with respect to the stator 130, and a cooling unit 230 configured to perform a cooling operation by supplying a cooling fluid 172 into the frame 110.

The cooling unit 230 may include a cooling fluid injection portion 171 configured to inject the cooling fluid 172 to a space between the frame 110 and the stator 130, and a circulation channel 235 along which the cooling fluid 172 circulates the inside of the frame 110. Here, the cooling fluid 172 may be oil. The cooling fluid injection portion 171 may include the aforementioned injection pipe 175 having a plurality of injection openings. The cooling fluid injection portion 171 may include a first injection portion 211 arranged along an axial line direction of the rotor 150, and a second injection portion 221 diverged from the first injection portion 211.

Two ends of the circulation channel 235 may be connected to the inlet 112 and the outlet 114 of the frame 110, respectively. The cooling unit 230 may be provided with a pump 237 for accelerating flow of the cooling fluid 172.

The cooling unit 230 may be provided with a cooling fluid cooler 238 configured to cool the cooling fluid 172. The cooling fluid cooler 238 may be implemented as a radiator configured to heat-exchange the cooling fluid 172 with air by flowing the cooling fluid 172 thereinto. The cooling fluid cooler 238 may include a heat pipe (not shown) along which the cooling fluid 172 flows, and a heat exchanger having radiating fins (not shown) provided at the heat pipe so as to increase a heat exchange area.

Under this configuration, once power is supplied to the stator coil 141, the rotor 150 rotates centering around the rotation shaft 151 by an electromagnetic induction.

Once power is a power is supplied to the stator coil 141, an inner temperature of the frame 110 is increased, and the cooling fluid 172 may be supplied into the frame 110 by the cooling unit 230.

More concretely, once the pump 237 is driven, the cooling fluid 172 inside the cooling fluid cooler 238 flows toward the frame 110, and then is introduced into the cooling fluid injection portion 171 inside the frame 110 through the inlet 112.

The cooling fluid 172 introduced into the cooling fluid injection portion 171 is injected through the respective injection openings 176. The injected cooling fluid 172 comes in direct contact with the frame 110 and the stator 130, and/or the stator coil 141, and/or the rotor 150, thereby cooling the frame 110 and the stator 130, and/or the stator coil 141, and/or the rotor 150.

The cooling fluid 172 downwardly flowing in the frame 110 may be discharged to outside of the frame 110 through the outlet 114, and may flow to the cooling fluid cooler 238 along the circulation channel 235.

The cooling fluid 172 may be cooled by being heat-exchanged with air, etc. at the cooling fluid cooler 238. The cooled cooling fluid 172 may flow along the circulation channel 235, and then may be injected into the frame 110. As these processes are repeated, a cooling operation may be performed.

Hereinafter, an electric motor according to a fifth embodiment of the present invention will be explained with reference to FIG. 13.

Figure 13:
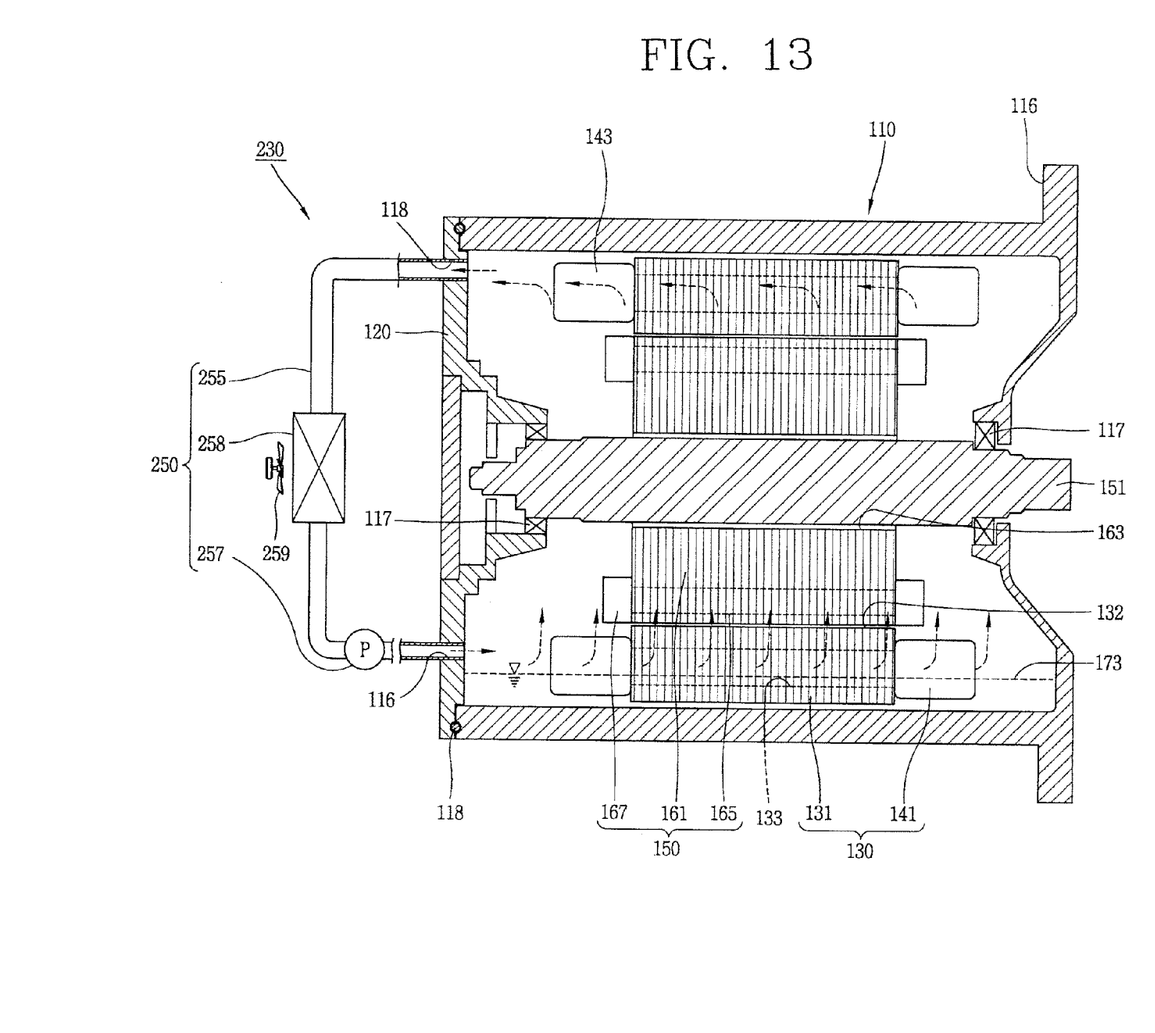
FIG. 13 is a sectional view of an electric motor according to a fifth embodiment of the present invention.

As shown in FIG. 13, an electric motor according to a fifth embodiment of the present invention comprises a frame 110, a stator 130 disposed in the frame 110, a rotor 150 disposed in the frame 110 so as to be rotatable with respect to the stator 130, and a cooling unit 250 configured to perform a cooling operation by supplying a cooling fluid 173 into the frame 110. The cooling fluid 173 may be a refrigerant applied to a vapor compression type refrigerating cycle.

The cooling unit 250 may be provided with a circulation channel 255 along which the cooling fluid 173 circulates the inside of the frame 110 such that the cooling fluid 173 is supplied into the frame 110.

An inlet 116 and an outlet 118 through which the cooling fluid 173 is introduced and discharged may be formed at one side of the frame 110. The inlet 116 and the outlet 118 may be formed at the cover 120, respectively.

Two ends of the circulation channel 255 may be connected to the inlet 116 and the outlet 118, respectively. Here, the inlet 116 may be formed to have a predetermined height from an inner bottom surface of the frame 110. Under this configuration, a predetermined amount of cooling fluid 173 (liquid refrigerant) may be temporarily stored in the frame 110.

The cooling unit 250 may be provided with a cooling fluid cooler 258 disposed on the circulation channel 255 and configured to condense the cooling fluid 173 (refrigerant) by cooling the cooling fluid 173 through heat radiation.

The cooling fluid cooler 258 may include a heat pipe (not shown) in which the cooling fluid 173 flows, and a heat exchanger having heat-transfer fins or heat-transfer plates (not shown) provided at the heat pipe so as to increase a heat area of the cooling fluid 173. A blower 259 configured to accelerate heat radiation of the cooling fluid 173 may be provided at one side of the cooling fluid cooler 258.

The cooling unit 250 may be further provided with a cooling fluid moving means configured to accelerate flow of the cooling fluid 173. Here, the cooling fluid moving means may be implemented as a pump 257 configured to supply the liquid cooling fluid 173 into the frame 110. The pump 257 may be arranged near the inlet 116 such that the liquid cooling fluid 173 is supplied into the frame 110 through the inlet 116.

Although not shown, the cooling fluid moving means may be implemented as a compressor configured to suck a gaseous refrigerant evaporated from the inside of the frame 110, compress and discharge the refrigerant. Here, the compressor may be implemented as a small capacity type compressor which generates a compression difference small enough to accelerate flow of the cooling fluid 173. The compressor may be arranged near the outlet 118 so as to suck the gaseous cooling fluid 173.

Under this configuration, once power is supplied to the stator coil 141, the rotor 150 is rotated centering around the rotation shaft 151 by an electromagnetic induction (reciprocal induction).

The liquid cooling fluid 173 temporarily stored at a lower part of the frame 110 absorbs peripheral latent heat thus to be evaporated. Once an inner temperature of the frame 110 is increased, an evaporation amount of the cooling fluid 173 is increased to rapidly cool the periphery.

The gaseous cooling fluid 173 evaporated from the inside of the frame 110 is leaked to the outside of the frame 110 through the outlet 118, and flows to the cooling fluid cooler 258 along the circulation channel 255.

The cooling fluid 173 is condensed at the cooling fluid cooler 258 by radiation, flows along the circulation channel 255, and is introduced into the frame 110 through the inlet 116 thus to be evaporated. As these processes are repeated, a cooling operation is performed. Here, the refrigerant which flows along the circulation channel 255 may flow with acceleration by the cooling fluid moving means, e.g., a pump or a compressor.

FIGS. 2 to 6 show an example that the frame groove is formed on an inner surface of the frame, and FIGS. 7 to 9 show an example that the stator groove is formed on an outer surface of the stator core. However, in the aforementioned embodiment with respect to FIGS. 2 to 6, the stator groove may be formed. Alternatively, in the aforementioned embodiment with respect to FIGS. 7 to 9, the frame groove may be formed. Still alternatively, in the aforementioned embodiment with respect to FIGS. 2 to 6 and in the aforementioned embodiment with respect to FIGS. 7 to 9, both the frame groove and the stator groove may be formed.

As aforementioned, according to one embodiment of the present invention, the cooling fluid is directly supplied into the frame. This may allow a cooling function to be significantly enhanced without increasing a size (volume) of the electric motor.

Furthermore, since the cooling fluid is directly injected into the coil ends of the stator, the coil ends which have a high possibility to have partial temperature increment may be prevented from having partial temperature increment.

Furthermore, since the cooling fluid is directly injected to the ends of the rotor, the rotor which has a difficulty in being cooled by being spaced from the stator with an air gap and thus by having an air layer at the periphery may be prevented from having temperature increment.

Furthermore, the cooling fluid is directly supplied to the stator core and the stator coil to cool the stator. And, the cooling fluid is directly injected to the rotor which has a difficulty in being cooled by being spaced from the stator with an air gap and thus by having an air layer at the periphery. This may prevent a short lifespan due to a high temperature, and may implement an electric motor for a vehicle having a high output density and high efficiency.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An electric vehicle comprising:
   a frame;
   a stator disposed in the frame;
   a rotor disposed in the frame so as to be rotatable with respect to the stator;
   a cooling fluid passage portion to introduce cooling fluid between the frame and the stator; and
   a cooling unit to form a cooling fluid circulation circuit with the cooling fluid passage portion,
   wherein the rotor comprises:
      a rotor core;
      a plurality of conductor bars provided at the rotor core; and
      end rings disposed at both ends of the rotor core so as to form a closed circuit by being connected to the respective conductor bars,
   wherein the cooling fluid passage portion is a cooling pipe disposed on the frame or the stator, and the cooling pipe has one or more openings to introduce the cooling fluid between the frame and the stator,
   wherein the cooling unit further comprises side injection portion portions disposed at both sides of the stator for injecting the cooling fluid toward the end of the rotor,
   wherein one or more openings of the cooling pipe are inclined toward an end portion of the stator in order to introduce cooling fluid to the end portion of the stator.

2. The electric vehicle of claim 1, wherein one or more grooves are formed on the frame, in such a manner that the cooling fluid introduced through the cooling pipe flows therealong in order to cool the frame.

3. The electric vehicle of claim 1, wherein one or more grooves are formed on the stator, in such a manner that the cooling fluid introduced through the cooling pipe flows therealong in order to cool the stator.

4. The electric vehicle of claim 1, wherein the cooling fluid passage portion is arranged on the frame in order to allow cooling fluid to flow through the frame and the cooling fluid passage portion includes one or more openings to introduce cooling fluid towards the stator.

5. The electric vehicle of claim 4, wherein one or more grooves are formed at the stator, in such a manner that the cooling fluid introduced through the cooling fluid passage portion flows therethrough in order to cool the stator.

6. The electric motor of claim 1, wherein each of the side injection portions is diverged from the cooling fluid passage portion to be located at both sides of the stator along a radial direction of the rotor.

7. The electric motor of claim 1, wherein each of the side injection portions comprises at least one lower injection opening for injecting the cooling fluid therethrough toward an end portion of the rotor.

8. The electric motor of claim 7, wherein the at least one lower injection opening is inclined toward the end portion of the rotor.

9. The electric motor of claim 7, wherein each of the side injection portions further comprises at least one upper injection opening for injecting the cooling fluid therethrough toward a coil end portion of the stator.

10. An electric motor for an electric vehicle comprising:
    a frame;
    a stator disposed in the frame;
    a rotor disposed in the frame so as to be rotatable with respect to the stator;
    a cooling fluid passage portion to introduce cooling fluid between the frame and the stator; and
    side injection portions disposed at both sides of the stator, respectively, for injecting the cooling fluid toward both ends of the rotor,
    wherein the rotor comprises:
       a rotor core;
       conductor bars provided at the rotor core; and
       end rings disposed at both ends of the rotor core so as to form a closed circuit by being connected to respective conductor bars,
    wherein the cooling fluid passage portion is a cooling pipe disposed on the frame or the stator, and the cooling pipe has one or more openings to introduce the cooling fluid between the frame and the stator, and
    wherein one or more openings of the cooling pipe are inclined toward an end portion of the stator in order to introduce cooling fluid to the end portion of the stator.

11. The electric motor of claim 10, wherein an accommodation portion is formed on the frame and another accommodation portion is formed on the stator to accommodate the cooling pipe between the frame and the stator.

12. The electric motor of claim 10, wherein one or more grooves are formed on the frame, in such a manner that the cooling fluid introduced through the cooling pipe flows therealong in order to cool the frame.

13. The electric motor of claim 10, wherein one or more grooves are formed on the stator, in such a manner that the cooling fluid introduced through the cooling pipe flows therealong in order to cool the stator.

14. The electric motor of claim 10, wherein the cooling fluid passage portion is arranged on the frame in order to allow cooling fluid to flow through the frame.

15. The electric motor of claim 14, wherein the cooling fluid passage portion includes one or more openings to introduce cooling fluid towards the stator.

16. The electric motor of claim 15, wherein one or more grooves are formed on the stator, in such a manner that the cooling fluid introduced through the cooling fluid passage portion flows therealong in order to cool the stator.

17. The electric motor of claim 10, wherein each of the side injection portions is diverged from the cooling fluid passage portion to be located at both sides of the stator along a radial direction of the rotor.

18. The electric motor of claim 10, wherein each of the side injection portions comprises at least one lower injection opening for injecting the cooling fluid therethrough toward an end portion of the rotor.

19. The electric motor of claim 18, wherein the at least one lower injection opening is inclined toward the end portion of the rotor.

20. The electric motor of claim 18, wherein each of the side injection portions further comprises at least one upper injection opening for injecting the cooling fluid toward a coil end portion of the stator.

* * * * *